(12) United States Patent
Terashima

(10) Patent No.: US 11,377,166 B2
(45) Date of Patent: Jul. 5, 2022

(54) HUMAN-POWERED VEHICLE CONTROL DEVICE

(71) Applicant: Shimano Inc., Osaka (JP)

(72) Inventor: Keiji Terashima, Osaka (JP)

(73) Assignee: Shimano Inc., Osaka (JP)

( * ) Notice: Subject to any disclaimer, the term of this patent is extended or adjusted under 35 U.S.C. 154(b) by 692 days.

(21) Appl. No.: 16/362,762

(22) Filed: Mar. 25, 2019

(65) Prior Publication Data

US 2019/0300106 A1    Oct. 3, 2019

(30) Foreign Application Priority Data

Mar. 29, 2018   (JP) .............................. JP2018-065723

(51) Int. Cl.
*B62J 45/421*        (2020.01)
*B62M 6/50*          (2010.01)
*B62M 6/55*          (2010.01)
*B62M 6/70*          (2010.01)
(Continued)

(52) U.S. Cl.
CPC .......... *B62J 45/421* (2020.02); *B62J 45/412* (2020.02); *B62M 6/50* (2013.01); *B62M 6/55* (2013.01); *B62M 6/70* (2013.01); *B62M 6/75* (2013.01)

(58) Field of Classification Search
CPC ........ B62J 45/421; B62J 45/412; B62M 6/50; B62M 6/55; B62M 6/70; B62M 6/75
See application file for complete search history.

(56) References Cited

U.S. PATENT DOCUMENTS

| 9,561,836 B2 | 2/2017 | Thompson |
| 2015/0120119 A1 | 4/2015 | Tauchi et al. |

(Continued)

FOREIGN PATENT DOCUMENTS

| CN | 104554596 A | 4/2015 |
| EP | 1 878 650 A1 | 1/2008 |
| EP | 1 967 446 A1 | 9/2008 |

(Continued)

OTHER PUBLICATIONS

Notice of Reasons for Refusal (English Translated) for Japanese Patent Application No. 2018-065723 date recorded Jan. 5, 2021. Retrieved from https://globaldossier.uspto.gov/#/details/JP/2018065723/A/76703 (Year: 2021).*

*Primary Examiner* — Calvin Cheung
(74) *Attorney, Agent, or Firm* — Global IP Counselors, LLP

(57) ABSTRACT

A human-powered vehicle control device includes an electronic controller that controls a motor assisting in propulsion of a human-powered vehicle including a crank. The controller changes an assist force ratio generated by the motor to human drive force input to the crank accordingly to the human drive force and a crank rotational speed. The controller increases the ratio as the human drive force increases while the crank rotational speed is constant and the human drive force is in a first range. The controller controls the motor so that the ratio is larger for a case where the human drive force is a first predetermined value in a first range and the crank rotational speed is in a second range than for a case where the human drive force is the first predetermined value and the crank rotational speed is in a third range higher than the second range.

15 Claims, 4 Drawing Sheets

(51) Int. Cl.
*B62J 45/412* (2020.01)
*B62M 6/75* (2010.01)

(56) References Cited

U.S. PATENT DOCUMENTS

2016/0318583 A1* 11/2016 Watarai .................... B62M 6/55
2017/0151998 A1 6/2017 Negoro

FOREIGN PATENT DOCUMENTS

| | | |
|---|---|---|
| JP | 9-156571 A | 6/1997 |
| JP | 9-207866 A | 8/1997 |
| JP | 10-59260 A | 3/1998 |
| JP | 2001-80570 A | 3/2001 |
| JP | 3974979 B2 | 9/2007 |
| JP | 2015-110402 A | 6/2015 |
| JP | 2016-7929 A | 1/2016 |
| JP | 5842105 B2 | 1/2016 |
| JP | 2017-100540 A | 6/2017 |
| JP | 2017-226296 A | 12/2017 |
| WO | 2007/077827 A1 | 7/2007 |

* cited by examiner

HUMAN-POWERED VEHICLE CONTROL DEVICE

CROSS-REFERENCE TO RELATED APPLICATIONS

This application claims priority to Japanese Patent Application No. 2018-065723, filed on Mar. 29, 2018. The entire disclosure of Japanese Patent Application No. 2018-065723 is hereby incorporated herein by reference.

BACKGROUND

Technical Field

The present invention generally relates to a human-powered vehicle control device.

Background Information

Japanese Laid-Open Patent Publication No. 10-59260 discloses a human-powered vehicle control device that controls a motor so that a ratio of an output of the motor to human drive force input to a human-powered vehicle is equal to a predetermined ratio.

SUMMARY

One object of the present disclosure is to provide a human-powered vehicle control device that assists in propulsion of a human-powered vehicle with a motor in a preferred manner.

A human-powered vehicle control device in accordance with a first aspect of the present disclosure comprises an electronic controller configured to control a motor that assists in propulsion of a human-powered vehicle including a crank. The electronic controller is configured to change a ratio of an assist force generated by the motor to a human drive force inputted to the crank in correspondence with the human drive force and a rotational speed of the crank. The electronic controller is configured to increase the ratio as the human drive force increases in a case where the rotational speed of the crank is constant and the human drive force is included in a first range. The electronic controller is configured to control the motor so that the ratio is larger for a case where the human drive force is a first predetermined value included in a first range and the rotational speed of the crank is included in a second range than for a case where the human drive force is the first predetermined value and the rotational speed of the crank is included in a third range that is higher than the second range.

With the human-powered vehicle control device in accordance with the first aspect, in a case where the human drive force is included in the first range and the rotational speed of the crank is included in the second range, even in a case where the human drive force input to the crank is the same, the assist force increases as the rotational speed of the crank decreases. Accordingly, even in a case where the rotational speed of the crank is low, the human-powered vehicle control device assists in propulsion of the human-powered vehicle with the motor in a preferred manner.

In accordance with a second aspect of the present disclosure, the human-powered vehicle control device according to the first aspect is configured so that the first range includes at least part of a range in which the human drive force is 0 Nm or greater and 40 Nm or less.

The human-powered vehicle control device in accordance with the second aspect assists in propulsion of the human-powered vehicle with the motor in a preferred manner even in a case where the rotational speed of the crank is low in at least part of a range in which the human drive force is 0 Nm or greater and 40 Nm or less.

In accordance with a third aspect of the present disclosure, the human-powered vehicle control device according to the first or second aspect is configured so that the second range includes at least part of a range in which the rotational speed of the crank is 0 rps or greater and 7/6 rps or less.

The human-powered vehicle control device in accordance with the third aspect assists in propulsion of the human-powered vehicle with the motor in a preferred manner even in a case where the rotational speed of the crank is low in which the rotational speed of the crank is 0 rps or greater and 7/6 rps or less.

In accordance with a fourth aspect of the present disclosure, the human-powered vehicle control device according to any one of the first to third aspects is configured so that at least part of the third range includes a range in which the rotational speed of the crank exceeds 7/6 rps.

With the human-powered vehicle control device in accordance with the fourth aspect, in a case where the rotational speed of the crank exceeds 7/6 rps, the human-powered vehicle easily travels in a stable manner. Accordingly, the ratio that is smaller than that for a case where the rotational speed of the crank is in the second range reduces consumption of the electric power.

In accordance with a fifth aspect of the present disclosure, the human-powered vehicle control device according to any one of the first to fourth aspects is configured so that the electronic controller is configured to control the motor so that the assist force does not exceed a predetermined first value.

The human-powered vehicle control device in accordance with the fifth aspect controls the assist force to be less than or equal to the predetermined first value. This reduces consumption of electric power and limits heat generation of the motor.

In accordance with a sixth aspect of the present disclosure, the human-powered vehicle control device according to any one of the first to fifth aspects is configured so that the electronic controller is configured to drives the motor so that the ratio differs for a case where the human drive force increases from the ratio for a case where the human drive force decreases while the rotational speed of the crank is constant and the human drive force is a second predetermined value included in the first range.

The human-powered vehicle control device in accordance with the sixth aspect assists in propulsion of the human-powered vehicle with the motor in a preferred manner in each of a case where the human drive force increases and a case where the human drive force decreases while the human drive force is in the first range in which the ratio increases as the human drive forces increases.

In accordance with a seventh aspect of the present disclosure, the human-powered vehicle control device according to any one of the first to sixth aspects is configured so that the second range at least partially differs for a case where the rotational speed of the crank increases from the second range for a case where the rotational speed of the crank decreases, and the third range at least partially differs for a case where the rotational speed of the crank increases from the third range for a case where the rotational speed of the crank decreases.

The human-powered vehicle control device in accordance with the seventh aspect allows each of the second range and the third range to be a preferred range in a case where the rotational speed of the crank increases and in a case where the rotational speed of the crank decreases.

In accordance with an eighth aspect of the present disclosure, the human-powered vehicle control device according to any one of the first to seventh aspects is configured so that the electronic controller is configured to drive the motor in correspondence with the human drive force and the rotational speed of the crank in a case where the rotational speed of the crank becomes greater than or equal to a predetermined second value.

The human-powered vehicle control device in accordance with the eighth aspect avoids a situation in which the user inadvertently drives the motor with the electronic controller.

In accordance with a ninth aspect of the present disclosure, the human-powered vehicle control device according to the eighth aspect is configured so that the predetermined second value is a value in a range of 1/60 rps or greater and 1/6 rps or less.

The human-powered vehicle control device in accordance with the ninth aspect drives the motor in a preferred manner in correspondence with the human drive force and the rotational speed of the crank in a case where the rotational speed of the crank is in the predetermined range of 1/60 rps or greater and 1/6 rps or less.

In accordance with a tenth aspect of the present disclosure, the human-powered vehicle control device according to any one of the first to ninth aspects is configured so that the electronic controller is configured to control the motor so that the ratio becomes equal to a target ratio obtained by multiplying a reference ratio corresponding to the human driven force by a constant determined in correspondence with the rotational speed of the crank.

The human-powered vehicle control device in accordance with the tenth aspect controls the motor in a preferred manner so that the ratio becomes equal to the target ratio that is in correspondence with the rotational speed of the crank.

In accordance with an eleventh aspect of the present disclosure, the human-powered vehicle control device according to any one of the first to tenth aspects is configured so that the electronic controller is configured to control the motor so that the ratio does not exceed a predetermined upper limit value.

The human-powered vehicle control device in accordance with the eleventh aspect can comply with legal regulations related to the ratio.

In accordance with a twelfth aspect of the present disclosure, the human-powered vehicle control device according to the eleventh aspect is configured so that the electronic controller is configured to control the motor in a plurality of control states, each of the control states having a different predetermined upper limit value.

With the human-powered vehicle control device in accordance with the twelfth aspect, the predetermined upper limit value can be changed by changing the control state of the motor.

In accordance with a thirteenth aspect of the present disclosure, the human-powered vehicle control device according to the twelfth aspect is configured so that the control states include a first control state and a second control state in which the predetermined upper limit value of the second control state is lower than that of the first control state, and the electronic controller is configured to control the motor so that the ratio is larger for a case where the rotational speed of the crank is less than or equal to a predetermined third value while controlling the motor in the second control state than for a case where the rotational speed of the crank is greater than or equal to a fourth value that is greater than the predetermined third value while controlling the motor in the first control state.

With the human-powered vehicle control device in accordance with the thirteenth aspect, even in the second control state in which the predetermined upper limit value is smaller than that in the first control state, in a case where the rotational speed of the crank is low, the ratio can be increased from that in the first control state. Accordingly, even in a case where the rotational speed of the crank is low, the motor assists the human-powered vehicle in a preferred manner.

In accordance with a fourteenth aspect of the present disclosure, a human-powered vehicle control device comprises an electronic controller configured to control a motor that assists in propulsion of a human-powered vehicle. The electronic controller is configured to change a ratio of an assist force generated by the motor to human drive force input to the human-powered vehicle in correspondence with the human drive force. The electronic controller is configured to control the motor so that the ratio differs for a case where the human drive force increases from for a case where the human drive force decreases while the human drive force is included in a first range.

With the human-powered vehicle control device in accordance with the fourteenth aspect, the ratio for a case where the human drive force is included in the first range assists in propulsion of the human-powered vehicle with the motor in a preferred manner in each of a case where the human drive force increases and a case where the human drive force decreases.

In accordance with a fifteenth aspect of the present disclosure, the human-powered vehicle control device according to the fourteenth aspect is configured so that the electronic controller is configured to control the motor so that the ratio is smaller for a case where the human-driven force increases than for a case where the human-driven force decreases while the human drive force is included in the first range.

With the human-powered vehicle control device in accordance with the fifteenth aspect, in a case where the human drive force is included in the first range, the assist force is unlikely to decrease even in a case where the human drive force decreases. This prevents pulsation of the assist force caused by pulsation of the human drive force.

The human-powered vehicle control device in accordance with the present disclosure assists in propulsion of the human-powered vehicle with the motor in a preferred manner.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

A human-powered vehicle control device 40 in one embodiment will now be described with reference to FIGS. 1 to 5. Hereafter, the human-powered vehicle control device 40 will simply be referred to as the control device 40. The control device 40 is provided on a human-powered vehicle 10. The human-powered vehicle 10 is a vehicle that can be driven by at least human drive force. The human-powered vehicle 10 includes, for example, a bicycle. There is no limit to the number of wheels of the human-powered vehicle 10. For example, the human-powered vehicle 10 can be a unicycle or a vehicle having three or more wheels. Examples of a human-powered vehicle include various bicycles such as a mountain bike, a road bike, a city bike, a cargo bike, and a recumbent bicycle, as well as an electric assist bicycle (E-bike). Hereinafter, in the embodiment, the human-powered vehicle 10 will be referred to as the bicycle.

Figure 1:
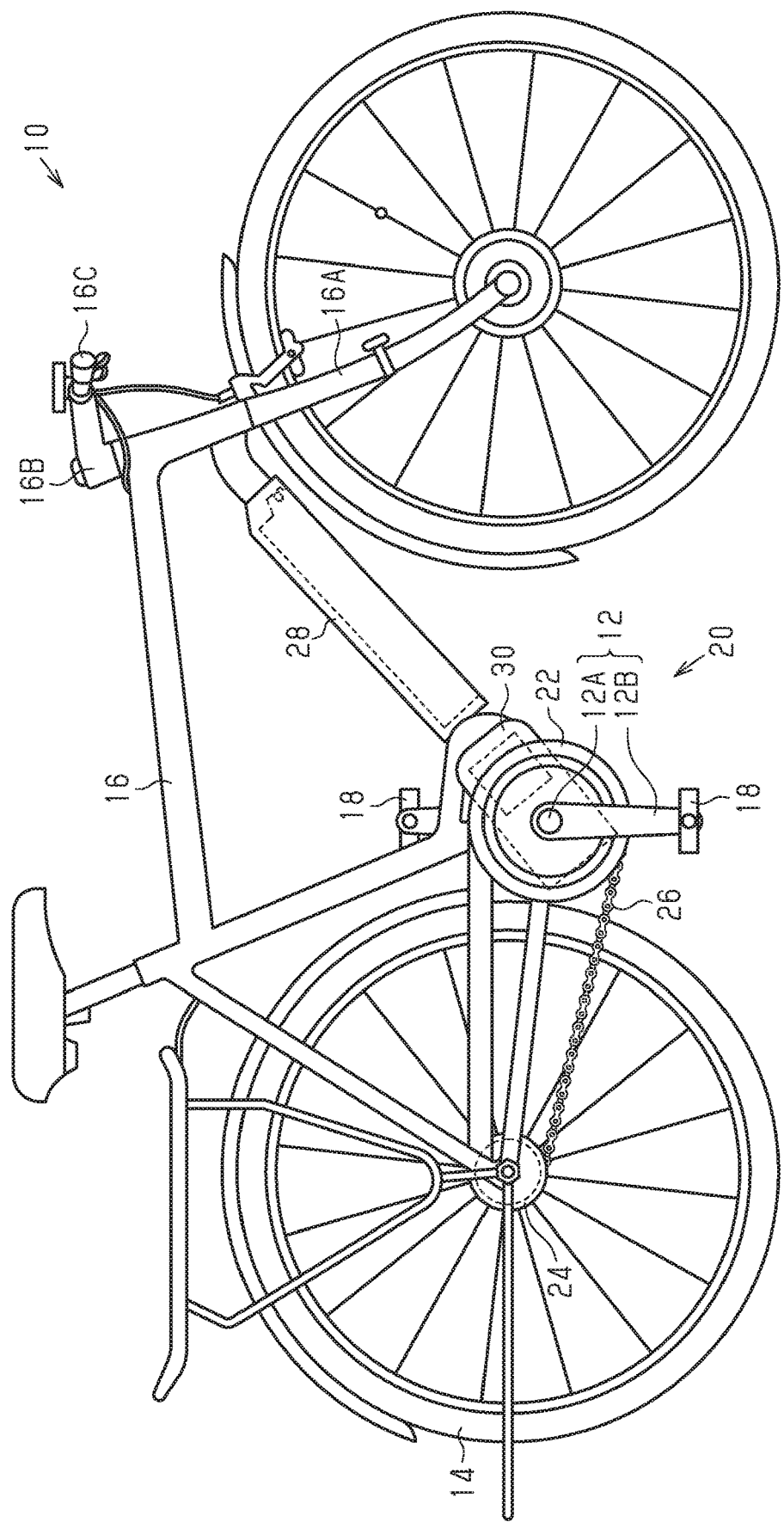
FIG. 1 is a side elevational view of a human-powered vehicle including a human-powered vehicle control device in accordance with one illustrated embodiment.

As shown in FIG. 1, the human-powered vehicle 10 includes a crank 12. The human-powered vehicle 10 further includes a drive wheel 14 and a frame 16. Human drive force H is input to the crank 12. The crank 12 includes a crankshaft 12A rotatable relative to the frame 16 and a crank arm 12B provided on each of opposite axial ends of the crankshaft 12A. A pedal 18 is connected to each of the crank arms 12B. The drive wheel 14 is driven by the rotation of the crank 12. The drive wheel 14 is supported by the frame 16. The crank 12 is connected to the drive wheel 14 by a drive mechanism 20. The drive mechanism 20 includes a first rotation body 22 coupled to the crankshaft 12A. The crankshaft 12A and the first rotation body 22 can be coupled by a first one-way clutch. The first one-way clutch is configured to rotate the first rotation body 22 forward in a case where the crank 12 is rotated forward and configured not to rotate the first rotation body 22 backward in a case where the crank 12 is rotated backward. The first rotation body 22 includes a sprocket, a pulley, or a bevel gear. The drive mechanism 20 further includes a linking member 26 and a second rotation body 24. The linking member 26 transmits a rotating force of the first rotation body 22 to the second rotation body 24. The linking member 26 includes, for example, a chain, a belt, or a shaft.

The second rotation body 24 is connected to the drive wheel 14. The second rotation body 24 includes a sprocket, a pulley, or a bevel gear. It is preferable that a second one-way clutch be provided between the second rotation body 24 and the drive wheel 14. The second one-way clutch is configured to rotate the drive wheel 14 forward in a case where the second rotation body 24 is rotated forward and configured not to rotate the drive wheel 14 backward in a case where the second rotation body 24 is rotated backward.

The human-powered vehicle 10 includes a front wheel and a rear wheel. The front wheel is attached to the frame 16 by a front fork 16A. A handlebar 16C is connected to the front fork 16A by a stem 16B. In the following embodiments, the rear wheel will be referred to as the drive wheel 14. However, the front wheel can be the drive wheel 14.

Figure 2:
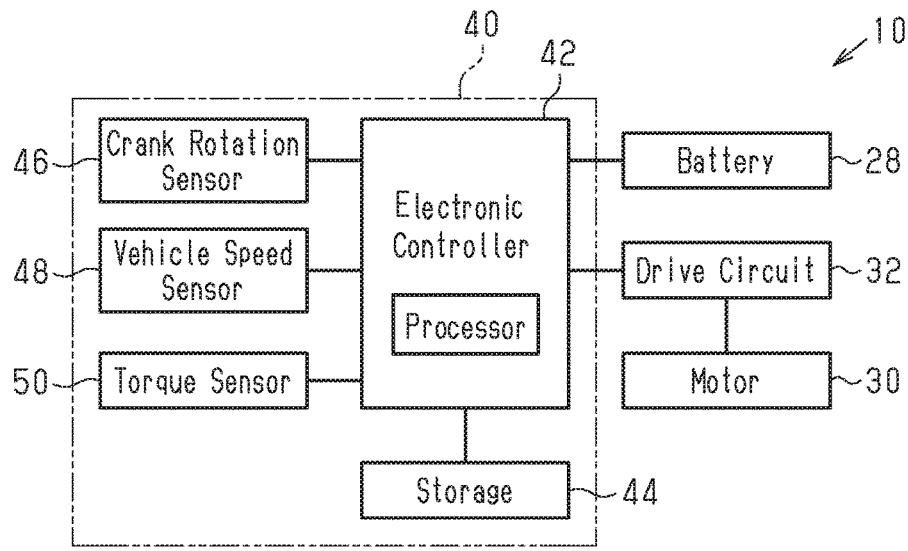
FIG. 2 is a block diagram showing the electrical configuration of the human-powered vehicle including the human-powered vehicle control device of the illustrated embodiment.

As shown in FIGS. 1 and 2, the human-powered vehicle 10 further includes a battery 28, a motor 30, and a drive circuit 32.

The battery 28 includes one or more battery cells. Each of the battery cells includes a rechargeable battery. The battery 28 is provided on the human-powered vehicle 10 and supplies electric power to other electrical components that are electrically connected to the battery 28 such as the motor 30 and the control device 40. The battery 28 is connected to an electronic controller 42 through wired connection or wireless connection in a manner allowing for communication. Hereinafter, the electronic controller 42 will simply be referred to as the controller 42. The battery 28 is configured to communicate with the controller 42 through, for example, power line communication (PLC). The battery 28 can be attached to the outside of the frame 16 or at least partially accommodated inside the frame 16.

Preferably, the motor 30 and the drive circuit 32 are provided on the same housing. The drive circuit 32 is configured to control the electric power supplied from the battery 28 to the motor 30. The drive circuit 32 is connected to the controller 42 of the control device 40 through wired connection or wireless connection in a manner allowing for communication. The drive circuit 32 communicates with the controller 42 through, for example, serial communication. The drive circuit 32 drives the motor 30 in accordance with a control signal from the controller 42. The drive circuit 32 includes an inverter circuit. The drive circuit 32 can be included in the controller 42. The motor 30 is configured to assist in propulsion of the human-powered vehicle 10. The motor 30 includes an electric motor. The motor 30 is provided to transmit rotation to the front wheel or a power transmission path of the human drive force H extending from the pedals 18 to the rear wheel. The motor 30 is provided on the frame 16, the rear wheel, or the front wheel of the human-powered vehicle 10. In one example, the motor 30 is coupled to the power transmission path between the crankshaft 12A and the first rotation body 22. It is preferable that a one-way clutch be provided in the power transmission path between the motor 30 and the crankshaft 12A so that the motor 30 is not rotated by the rotating force of the crank 12 in a case where the crankshaft 12A is rotated in a direction in which the human-powered vehicle 10 is moved forward. Components other than the motor 30 and the drive circuit 32 can be provided on the housing on which the motor 30 and the drive circuit 32 are provided. For example, a reduction gear that reduces the rotational speed of the motor 30 and then outputs the rotation can be provided on the housing.

As shown in FIG. 2, the control device 40 includes the controller 42. In one example, the control device 40 further includes a storage (memory device) 44, a crank rotation sensor 46, a vehicle speed sensor 48, and a torque sensor 50.

The terms "controller" and "electronic controller" as used herein refer to hardware that executes a software program and does not include a human. The controller 42 includes at least one processor that executes predetermined control programs. The processor includes, for example, a central processing unit (CPU) or a micro-processing unit (MPU). The controller 42 can include one or more microcomputers with one or more processors. The storage 44 stores various control programs and information used for various control processes. The storage 44 includes any computer storage device or any non-transitory computer-readable medium with the sole exception of a transitory, propagating signal. For example, storage 44 includes a non-volatile memory and a volatile memory. The controller 42 and the storage 44 are provided, for example, on the housing on which the motor 30 is provided.

The crank rotation sensor 46 is configured to detect a rotational speed N of the crank 12. The crank rotation sensor 46 is mounted on the frame 16 of the human-powered vehicle 10 or the housing on which the motor 30 is provided. The crank rotation sensor 46 includes a magnetic sensor that outputs a signal corresponding to the magnetic field strength. The crank rotation sensor 46 can be any sensor that can produce a signal that is indicative of the rotational speed N of the crank 12. A ring-shaped magnet having a magnetic field strength that changes in a circumferential direction is provided on the crankshaft 12A or in the power transmission path between the crankshaft 12A and the first rotation body 22. The crank rotation sensor 46 is connected to the controller 42 through wired connection or wireless connection in a manner allowing for communication. The crank rotation sensor 46 outputs a signal corresponding to the rotational speed N of the crank 12 to the controller 42.

The crank rotation sensor 46 can be provided on a member that rotates integrally with the crankshaft 12A in the transmission path of the human drive force H between the crankshaft 12A and the first rotation body 22. For example, the crank rotation sensor 46 can be provided on the first rotation body 22 in a case where a one-way clutch is not provided between the crankshaft 12A and the first rotation body 22.

The vehicle speed sensor 48 is configured to detect a rotational speed of the wheel. The vehicle speed sensor 48 is electrically connected to the controller 42 through wired connection or wireless connection. The vehicle speed sensor 48 is connected to the controller 42 through wired connection or wireless connection in a manner allowing for communication. The vehicle speed sensor 48 outputs a signal in accordance with the rotational speed of the wheel to the controller 42. The controller 42 calculates a vehicle speed V of the human-powered vehicle 10 based on the rotational speed of the wheel. In a case where the vehicle speed V is greater than or equal to a predetermined value, the controller 42 stops the motor 30. The predetermined value is, for example, 25 km per hour or 45 km per hour. Preferably, the vehicle speed sensor 48 includes a magnetic reed constructing a reed switch or Hall element. The vehicle speed sensor 48 can be coupled to a chain stay of the frame 16 and configured to detect a magnet coupled to the rear wheel. The vehicle speed sensor 48 can be provided on the front fork 16A and configured to detect a magnet coupled to the front wheel. Thus, in the case of a reed switch or a Hall element, the vehicle speed sensor 48 indirectly detects the rotational speed of the wheel by detecting a magnet attached to the wheel. The vehicle speed sensor 48 can be any sensor that can produce a signal that is indicative of the rotational speed of the wheel. Alternatively, the vehicle speed sensor 48 can directly detect the rotational speed of the wheel by using a speedometer gear assembly that is directly rotated by the wheel.

The torque sensor 50 is provided on the housing on which the motor 30 is provided. The torque sensor 50 is configured to detect the human drive force H inputted to the crank 12. The torque sensor 50 is provided, for example, at an upstream side of the first one-way clutch in the power transmission path. The torque sensor 50 includes a strain sensor, a magnetostrictive sensor, or the like. A strain sensor includes a strain gauge. In a case where the torque sensor 50 includes a strain sensor, the strain sensor is provided, for example, on the outer circumference of the rotation body included in the power transmission path. The torque sensor 50 can be any sensor that can produce a signal that is indicative of the human drive force H inputted to the crank 12. The torque sensor 50 can include a wireless or a wired communicator. The communicator of the torque sensor 50 is configured to communicate with the controller 42.

The controller 42 controls the motor 30. The controller 42 changes a ratio A of an assist force M generated by the motor 30 to the human drive force H inputted to the crank 12 in correspondence with the human drive force H. The controller 42 changes the ratio A in correspondence with the human drive force H and the rotational speed N of the crank 12. The ratio A may refer to a ratio AT of torque TM of the assist force M generated by the motor 30 to torque TH of the human drive force H inputted to the human-powered vehicle 10. The ratio A may refer to a ratio AW of power (watt) of the assist force M generated by the motor 30 to power (watt) of the human drive force H inputted to the human-powered vehicle 10. The power based on the human drive force H is calculated by multiplying torque of the human drive force H inputted to the crank 12 by the rotational speed N of the crank 12. In a case where the output of the motor 30 is input to the power transmission path of the human drive force H via a reduction gear, the output of the reduction gear is referred to as the assist force M generated by the motor 30. In a case where the speed of the human-powered vehicle 10 is greater than or equal to a predetermined speed, the controller 42 stops the assistance with the motor 30. The predetermined speed is, for example, 25 km per hour or 45 km per hour.

The controller 42 determines a reference ratio AX corresponding to the human driven force H and calculates a target ratio AY using the reference ratio AX. The controller 42 controls the motor 30 so that the ratio A becomes equal to the target ratio AY. In one example, the target ratio AY is a value obtained by multiplying the reference ratio AX corresponding to the human drive force H by a constant K determined in correspondence with the rotational speed N of the crank 12.

The controller 42 controls the motor 30 so that the assist force M does not exceed a predetermined first value Ml. The controller 42 controls the motor 30 so that the ratio A does not exceed a predetermined upper limit value AZ. The controller 42 is configured to control the motor 30 in a plurality of control states. Each of the control states has a different predetermined upper limit value AZ. The control states include a first control state and a second control state of which the predetermined upper limit value AZ is lower than that of the first control state. The control states can be three or more. In such a case, in two of the three or more control states, the control state having a higher predetermined upper limit value AZ corresponds to the first control state, and the control state having a lower predetermined upper limit value AZ corresponds to the second control state.

The controller 42 increases the ratio A as the human drive force H increases in a case where the rotational speed N of the crank 12 is constant and the human drive force H is included in a first range RHX. In a case where the controller 42 controls the ratio AT, it is preferred that the first range RHX include at least part of a range in which the human drive force H is 0 Nm or greater and 40 Nm or less. In a case where the controller 42 controls the ratio AT, it is further preferred that the first range RHX include at least part of a range in which the human drive force H is 0 Nm or greater and 30 Nm or less.

In a case where the rotational speed N of the crank 12 is constant and the human drive force H is a second predetermined value HB included in the first range RHX, the controller 42 drives the motor 30 so that the ratio A differs for a case where the human drive force H increases from the ratio A for a case where the human drive force H decreases. The first range RHX can include a first range RHX1 for a case where the human drive force H increases and a first range RHX2 for a case where the human drive force H decreases. The controller 42 can control the motor 30 so that the first range RHX1 at least partially differs for a case where the human drive force H increases from the first range RHX2 for a case where the human drive force H decreases. In this case, the second predetermined value HB corresponds with a value included in both the first range RHX1 and the first range RHX2. In a case where the rotational speed N of the crank 12 is constant, the controller 42 performs a hysteretic control by differentiating at least part of the first range RHX1 for a case where the human drive force H increases from the first range RHX2 for a case where the human drive force H decreases.

Figure 4:
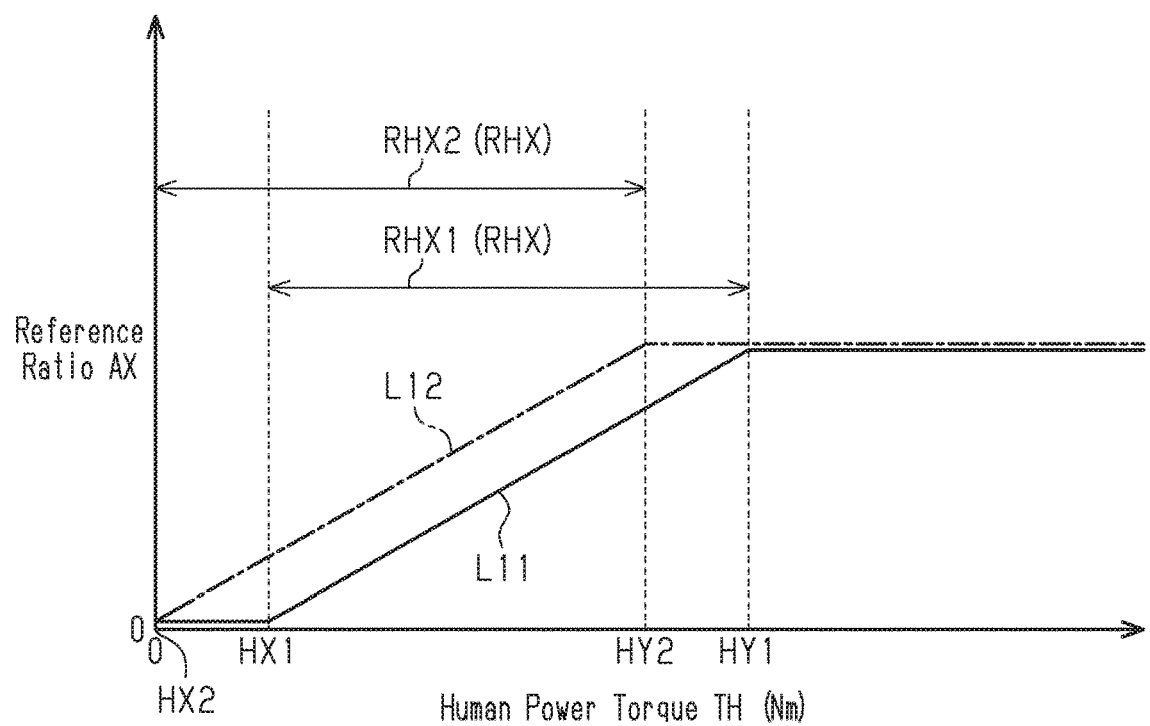
FIG. 4 is a graph showing one example of the relationship between a human driving power and a reference ratio stored in a storage shown in FIG. 2.

FIG. 4 shows one example of the first ranges RHX1 and RHX2 relative to the relationship between the human power torque TH and the reference ratio AX in a case where the controller 42 controls the ratio AT.

In the example indicated by the solid line L11 in FIG. 4, the first range RHX1 for a case where the human drive force H increases includes a range greater than or equal to a first lower limit value HX1 and less than or equal to a first upper limit value HY1. In a case where the human drive force H increases and the human drive force H is in a range less than or equal to the first lower limit value HX1, the ratio A is set to zero. In a case where the human drive force H increases and the human drive force H is in a range greater than the first upper limit value HY1, the reference ratio AX is set to a constant value.

In the example indicated by the dashed line L12 in FIG. 4, the first range RHX2 for a case where the human drive force H decreases includes a range greater than or equal to a second lower limit value HX2 and less than or equal to a second upper limit value HY2. The second lower limit value HX2 is, for example, zero. It is preferred that the first lower limit value HX1 be greater than the second lower limit value HX2. It is preferred that the first upper limit value HY1 be greater than the second upper limit value HY2. In a case where the human drive force H decreases, in a range in which the human drive force H is greater than the second upper limit value HY2, the reference ratio AX is set to a constant value.

The controller 42 drives the motor 30 in correspondence with the human drive force H and the rotational speed N of the crank 12 in a case where the rotational speed N of the crank 12 becomes greater than or equal to a predetermined second value NA. Specifically, the constant K is set to zero for a case where the rotational speed N of the crank 12 is less than the second value NA, and the constant K is set to greater than zero for a case where the rotational speed N of the crank 12 is greater than or equal to the second value NA. The predetermined second value NA is a value in a range of 1/60 rps (revolutions per second) or greater and 1/6 rps or less. The second value NA can be a value in a range of 0 rps or greater and 1/6 rps or less. It is preferred that the second value NA be 1/15 rps or 1/12 rps.

The controller 42 controls the motor 30 so that the ratio A differs for a case where the human drive force H is a first predetermined value HA included in the first range RHX and the rotational speed N of the crank 12 is included in a second range RNX from the ratio A for a case where the human drive force H is the first predetermined value HA and the rotational speed N of the crank 12 is included in a third range RNY. The third range RNY is higher than the second range RNX. The controller 42 controls the motor 30 so that the ratio A is larger for a case where the human drive force H is the first predetermined value HA and the rotational speed N of the crank 12 is included in the second range RNX than for a case where the human drive force H is the first predetermined value HA and the rotational speed N of the crank 12 is included in the third range RNY. The second range RNX includes at least part of a range in which the rotational speed N of the crank 12 is 0 rps or greater and 7/6 rps or less. It is preferred that the second range RNX be 0 rps and greater and 1 rps or less. It is preferred that the second range RNX be greater than or equal to the second value NA and 1 rps or less. The third range RNY includes at least part of a range in which the rotational speed N of the crank 12 exceeds 7/6 rps.

The second range RNX includes a second range RNX1 for a case where the rotational speed N of the crank 12 increases and a second range RNX2 for a case where the rotational speed N of the crank 12 decreases. The second range RNX1 at least partially differs for a case where the rotational speed N of the crank 12 increases from the second range RNX2 for a case where the rotational speed N of the crank 12 decreases. In one example, the second range RNX is wider for a case where the rotational speed N of the crank 12 increases than the second range RNX for a case where the rotational speed N of the crank 12 decreases. For example, the second range RNX includes a range greater than the second value NA and less than a first upper limit value NY1 for a case where the rotational speed N of the crank 12 increases, and the second range RNX includes a range greater than or equal to the second value NA and less than a second upper limit value NY2 for a case where the rotational speed N of the crank 12 decreases. The second upper limit value NY2 is smaller than the first upper limit value NY1. In a state in which the rotational speed N of the crank 12 is greater than or equal to the predetermined second value NA, the controller 42 performs a hysteretic control by differentiating at least part of the second range RNX1 for a case where the rotational speed N of the crank 12 increases from the second range RNX2 for a case where the rotational speed N of the crank 12 decreases.

The third range RNY includes a third range RNY1 for a case where the rotational speed N of the crank 12 increases and a third range RNY2 for a case where the rotational speed N of the crank 12 decreases. The third range RNY1 at least partially differs for a case where the rotational speed N of the crank 12 increases from the third range RNY2 for a case where the rotational speed N of the crank 12 decreases. In one example, the third range RNY includes a range greater than or equal to the first upper limit value NY1 for a case where the rotational speed N of the crank 12 increases, and the third range RNY includes a range greater than or equal to the second upper limit value NY2 for a case where the rotational speed N of the crank 12 decreases.

Figure 5:
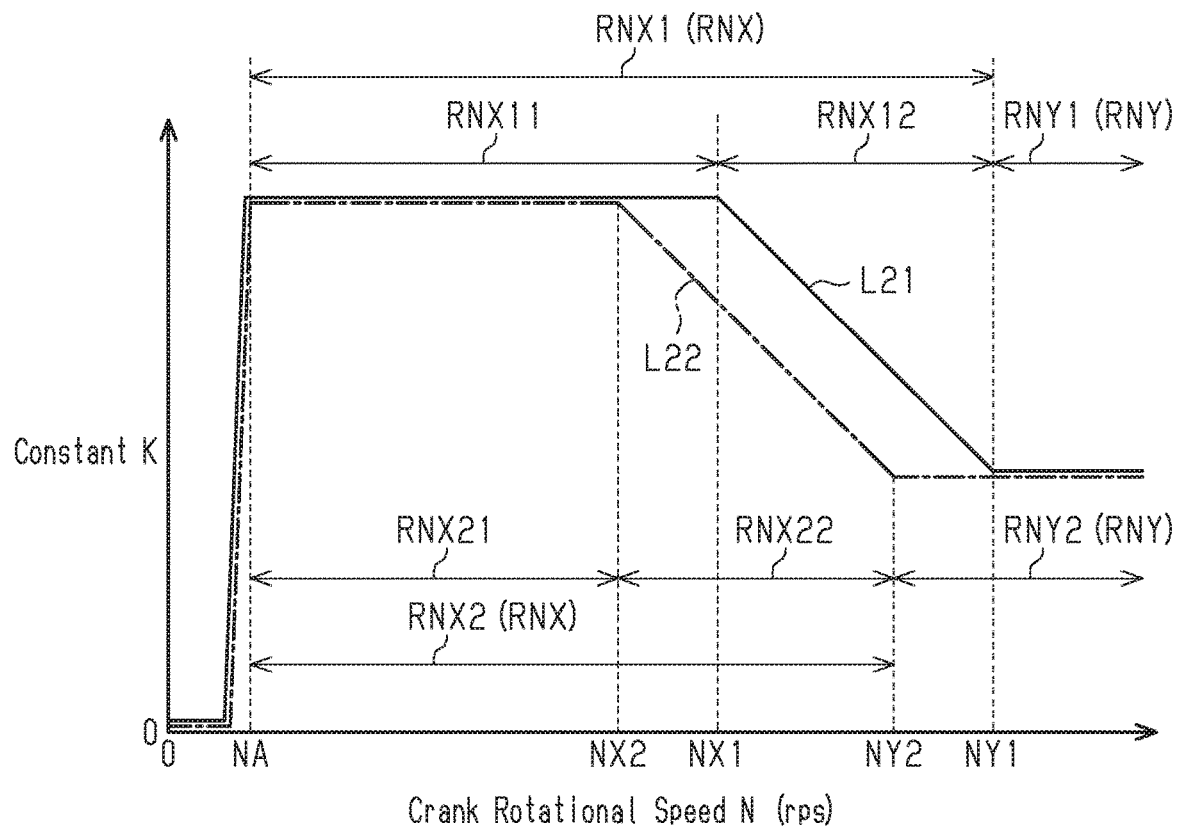
FIG. 5 is a graph showing one example of the relationship between a rotational speed of a crank and a constant stored in the storage shown in FIG. 2.

FIG. 5 shows the relationship between the rotational speed N of the crank 12 and the constant K. In the example indicated by the solid line L21 in FIG. 5, the second range RNX1 includes a first range portion RNX11 and a second range portion RNX12 that is larger than the first range portion RNX11 for a case where the rotational speed N of the crank 12 increases. The first range portion RNX11 includes a range greater than or equal to the second value NA and less than a first intermediate value NX1. The second range portion RNX12 includes a range greater than or equal to the first intermediate value NX1 and less than the first upper limit value NY1. In the first range portion RNX11, the constant K is set to be a constant value greater than zero. In the second range portion RNX12, the constant K is set to decrease as the rotational speed N of the crank 12 increases. In the second range portion RNX12, the constant K is smaller than that in the first range portion RNX11. In the third range RNY1 that is greater than or equal to the first upper limit value NY1, the constant K is set to be a constant value greater than zero and smaller than that in the second range RNX1.

In the example indicated by the dashed line L22 in FIG. 5, the second range RNX2 includes a third range portion RNX21 and a fourth range portion RNX22 that is larger than the third range portion RNX21 for a case where the rotational speed N of the crank 12 decreases. The third range portion RNX21 includes a range greater than or equal to the second value NA and less than a second intermediate value NX2. The fourth range portion RNX22 includes a range greater than or equal to the second intermediate value NX2 and less than the second upper limit value NY2. In the third range portion RNX21, the constant K is set to be a constant value greater than zero. In the fourth range portion RNX22, the constant K is set to decrease as the rotational speed N of the crank 12 increases. In the fourth range portion RNX22, the constant K is smaller than that in the third range portion RNX21. In the third range RNY2 that is greater than or equal to the second upper limit value NY2, the constant K is set to be a constant value greater than zero and smaller than that in the second range RNX2. The first range portion RNX11 is wider than the third range portion RNX21. The first intermediate value NX1 is greater than the second intermediate value NX2. The fourth range portion RNX22 can have substantially the same width as the second range portion RNX12.

The controller 42 controls the motor 30 so that the ratio A is greater for a case where the rotational speed N of the crank 12 is less than or equal to a predetermined third value NB while controlling the motor 30 in the second control state than for a case where the rotational speed N of the crank 12 is greater than or equal to a fourth value NC that is greater than the predetermined third value NB while controlling the motor 30 in the first control state. In the example shown in FIG. 5, the third value NB is at least included in the first range portion RNX11 and the third range portion RNX21, and the fourth value NC is at least included in the third ranges RNY1 and RNY2.

Figure 3:
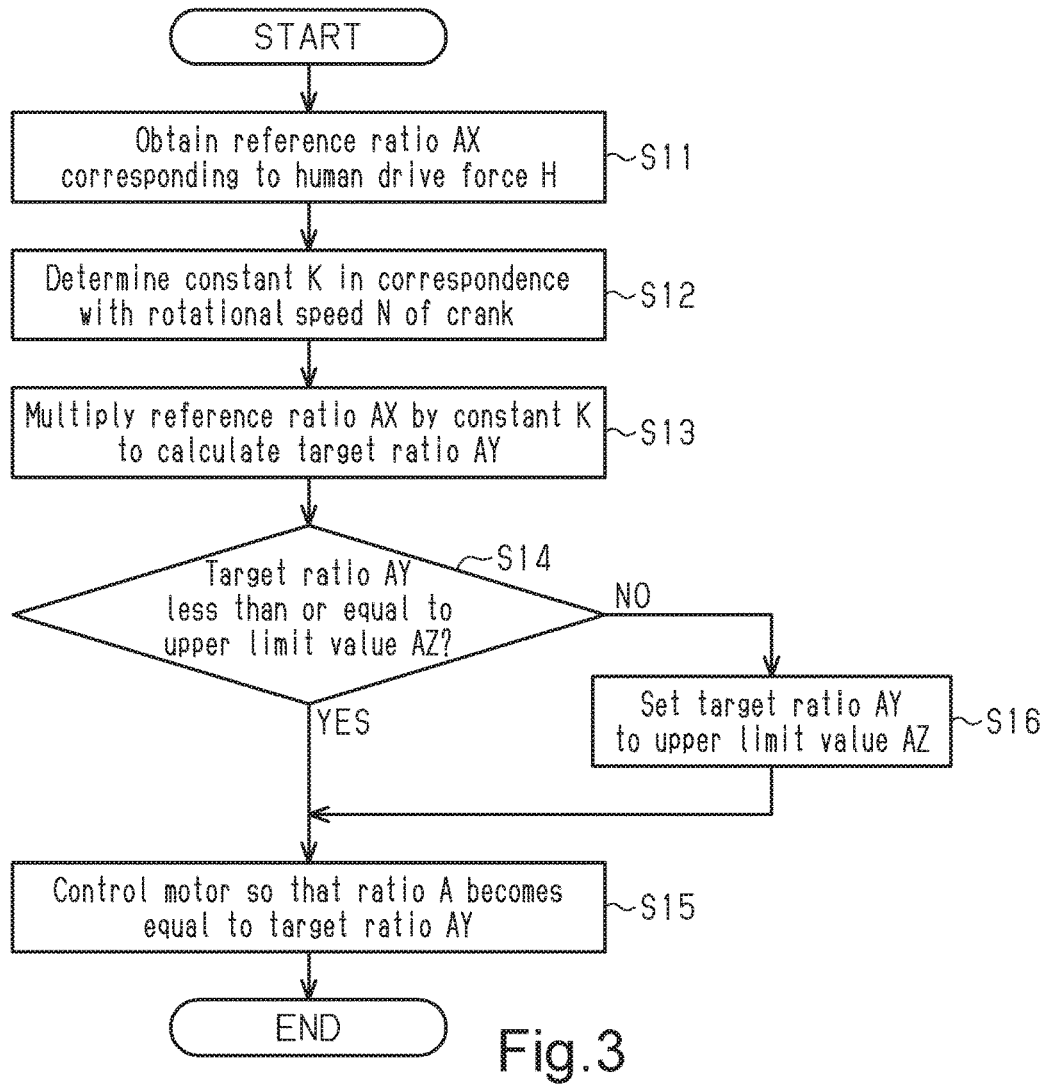
FIG. 3 is a flowchart illustrating a control process for controlling a motor executed by an electronic controller shown in FIG. 2.

The process for controlling the motor 30 will now be described with reference to FIG. 3. In a case where electric power is supplied to the controller 42 from the battery 28, the controller 42 starts the process and proceeds to step S11 illustrated in the flowchart in FIG. 3. As long as the electric is supplied, the controller 42 executes the process from step S11 in predetermined cycles.

In step S11, the controller 42 obtains the reference ratio A corresponding to the human drive force H and proceeds to step S12. For example, the controller 42 obtains the reference ratio AX in correspondence with the human power torque TH and the relationship between the human power torque TH and the reference ratio AX shown in FIG. 4. In a case where the human power torque TH is increasing, the controller 42 obtains the reference ratio AX in accordance with the solid line L11 of FIG. 4. In a case where the human power torque TH is decreasing, the controller 42 obtains the reference ratio AX in accordance with the dashed line L12 in FIG. 4. In a case where the human power torque TH shifts from an increasing state to a decreasing state, the ratio AX is maintained and not decreased even while the human power torque TH is decreasing until the ratio AX obtained from the dashed line L12 becomes smaller than the ratio AX obtained from the solid line L11.

In step S12, the controller 42 determines the constant K in correspondence with the rotational speed N of the crank 12 and proceeds to step S13. For example, the controller 42 determines the constant K in correspondence with the rotational speed N of the crank 12 and the relationship between the rotational speed N of the crank 12 and the constant K shown in FIG. 5. In a case where the rotational speed N of the crank 12 is increasing, the controller 42 determines the constant K in accordance with the solid line L21 in FIG. 5. In a case where the rotational speed N of the crank 12 is decreasing, the controller 42 determines the constant K in accordance with the dashed line L22 of FIG. 5.

In step S13, the controller 42 multiplies the reference ratio AX obtained in step S11 by constant K determined in step S12 to calculate the target ratio AY and then proceeds to step S14.

In step S14, the controller 42 determines whether or not the target ratio AY is less than or equal to the upper limit value AZ. In a case where the target ratio AY is less than or equal to the upper limit value AZ, the controller 42 proceeds to step S15. In step S15, the controller 42 controls the motor 30 so that the ratio A becomes equal to the target ratio AY and then ends the process.

In step S14, in a case where it is determined that the target ratio AY is not less than or equal to the upper limit value AZ, the controller 42 proceeds to step S16. In step S16, the controller 42 sets the target ratio AY to the upper limit value AZ and proceeds to step S15. In step S15, the controller 42 controls the motor 30 so that the ratio A becomes equal to the target ratio AY set in step S16 and then ends the process.

Modifications

The description related with the above embodiment exemplifies, without any intention to limit, an applicable form of a human-powered vehicle control device according to the present disclosure. In addition to the embodiment described above, the human-powered vehicle control device according to the present disclosure is applicable to, for example, modifications of the above embodiments that are described below and combinations of at least two of the modifications that do not contradict each other. In the modifications described hereafter, same reference numerals are given to those components that are the same as the corresponding components of the above embodiment.

The controller 42 can be configured to control the motor 30 so that at least part of the relationship between the rotational speed N of the crank 12 and the ratio A differs in each control state. For example, the controller 42 changes the relationship between the rotational speed N of the crank 12 and the constant K in each control state.

Figure 6:
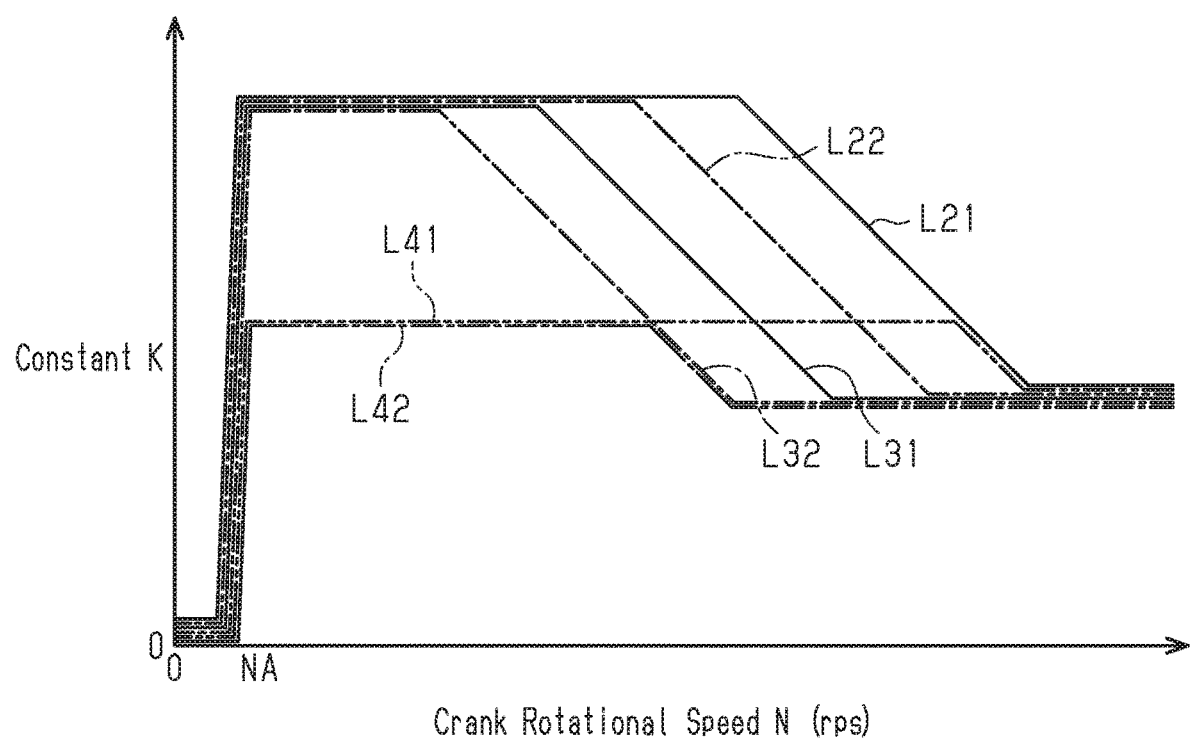
FIG. 6 is a graph showing one example of the relationship between a rotational speed of a crank and a constant stored in a storage of a modification.

In a first example, the controller 42 be configured to changes the second range RNX1 in each control state. For example, the relationship between the rotational speed N of the crank 12 and the constant K in the first control state can be the relationship indicated by the solid line L21 in FIG. 6 in a case where the rotational speed N of the crank 12 increases, and the relationship between the rotational speed N of the crank 12 and the constant K in the second control state can be the relationship indicated by the sold line L31 in a case where the rotational speed N of the crank 12 increases. The upper limit value of the second range RNX in the solid line L31 is smaller than the upper limit value of the second range RNX in the solid line L21. The upper limit value of the second range RNX in the solid line L31 can be the same as the upper limit value of the second range RNX in the solid line L21. In this case, the relationship between the rotational speed N of the crank 12 and the constant K can be the relationship indicated by the dashed line L22 in a case where the rotational speed N of the crank 12 decreases in the first control state, and the relationship between the rotational speed N of the crank 12 and the constant K can be the relationship indicated by the dashed line L32 in a case where the rotational speed N of the crank 12 increases in the second control state. The upper limit value of the second range RNX in the dashed line L32 is smaller than the upper limit value of the second range RNX in the dashed line L22. The upper limit value of the second range RNX in the dashed line L32 can be the same as the upper limit value of the second range RNX in the dashed line L22. Further, for example, the relationship between the rotational speed N of the crank 12 and the constant K can be the relationship indicated by the solid line L31 in a case where the rotational speed N of the crank 12 increases in the first control state, and the relationship between the rotational speed N of the crank 12 and the constant K can be the relationship indicated by the solid line L21 in a case where the rotational speed N of the crank 12 increases in the second control state. In this case, the relationship between the rotational speed N of the crank 12 and the constant K can be the relationship indicated by the dashed line L32 in a case where the rotational speed N of the crank 12 decreases in the first control state, and the relationship between the rotational speed N of the crank 12 and the constant K can be the relationship indicated by the dashed line L22 in a case where the rotational speed N of the crank 12 increases in the second control state.

In a second example, the controller 42 can be configured to change the maximum value of the constant K in the second range RNX in each control state in addition to changing the second range RNX1 in each control state. For example, the relationship between the rotational speed N of the crank 12 and the constant K can be the relationship indicated by the solid line L21 in a case where the rotational speed N of the crank 12 increases in the first control state, and the relationship between the rotational speed N of the crank 12 and the constant K can be the relationship indicated by the double-dashed line L41 in a case where the rotational speed N of the crank 12 increases in the second control state. The upper limit value of the constant K in the second range RNX on the double-dashed line L41 is smaller than the upper limit value of the constant K in the second range RNX on the solid line L21. In this case, the relationship between the rotational speed N of the crank 12 and the constant K can be the relationship indicated by the dashed line L22 in a case where the rotational speed N of the crank 12 decreases in the first control state, and the relationship between the rotational speed N of the crank 12 and the constant K can be the relationship indicated by the dashed line L42 in a case where the rotational speed N of the crank 12 increases in the second control state. The upper limit value of the constant K in the second range RNX on the dashed line L42 is smaller than the upper limit value of the constant K in the second range RNX on the dashed line L22. Further, the relationship between the rotational speed N of the crank 12 and the constant K can be the relationship indicated by the double-dashed line L41 in a case where the rotational speed N of the crank 12 increases in the first control state, and the relationship between the rotational speed N of the crank 12 and the constant K can be the relationship indicated by the solid line L21 in a case where the rotational speed N of the crank 12 increases in the second control state. In this case, the relationship between the rotational speed N of the crank 12 and the constant K state can be the relationship indicated by the dashed line L42 in a case where the rotational speed N of the crank 12 decreases in the first control, and the relationship between the rotational speed N of the crank 12 and the constant K can be the relationship indicated by the dashed line L22 in a case where the rotational speed N of the crank 12 increases in the second control state.

In a third example, the controller 42 does not have to change the second range RNX1 in each control state and can change the maximum value of the constant K in the second range RNX in each control state.

The controller 42 can be configured to control the motor 30 so that at least part of the relationship between the human power torque TH and the reference ratio AX differs in each control state. For example, the controller 42 changes the relationship between the human power torque TH and the reference ratio AX in each control state. For example, the maximum value of the reference ratio AX differs in each control state.

In FIG. 5, one of the first range portion RNX11 and the second range portion RNX12 can be omitted from the second range RNX1 for a case where the rotational speed N of the crank 12 increases. In a case where the second range portion RNX12 is omitted, the entire second range RNX1 for a case where the rotational speed N of the crank 12 increases becomes the first range portion RNX11. In a case where the first range portion RNX11 is omitted, the entire second range RNX1 for a case where the rotational speed N of the crank 12 increases becomes the second range portion RNX12.

In FIG. 5, one of the third range portion RNX21 and the fourth range portion RNX22 can be omitted from the second range RNX2 for a case where the rotational speed N of the crank 12 decreases. In a case where the fourth range portion RNX22 is omitted, the entire second range RNX2 for a case where the rotational speed N of the crank 12 decreases becomes the third range portion RNX21. In a case where the third range portion RNX21 is omitted, the entire second range RNX2 for a case where the rotational speed N of the crank 12 decreases becomes the fourth range portion RNX22.

The controller 42 can be configured to control the motor 30 so that the second range RNX for a case where the rotational speed N of the crank 12 increases is the same as the second range RNX2 for a case where the rotational speed N of the crank 12 decreases.

The controller 42 can be configured to control the motor 30 so that the third range RNY1 for a case where the rotational speed N of the crank 12 increases is the same as the third range RNY2 for a case where the rotational speed N of the crank 12 decreases.

The controller 42 can be configured to control the motor 30 so that in a case where the rotational speed N of the crank 12 is constant and the human drive force H is the second predetermined value HB included in the first range RHX, the ratio A for a case where the human drive force H increases is the same as the ratio A for a case where the human drive force H decreases.

The controller 42 can be configured to change the ratio A in correspondence with the human drive force H. In this case, the controller 42 does not have to change the ratio A in correspondence with the rotational speed N of the crank 12. For example, step S12 is omitted from the process illustrated in FIG. 3, and the reference ratio AX is set as the target ratio AY in step S13. In this case, it is also preferred that the controller 42 control the motor 30 so that in a case where the human drive force H is included in the first range RHX, the ratio A differs for a case where the human drive force H increases from the ratio A for a case where the human drive force H decreases. In this modification, the controller 42 can control the motor 30 so that in a case where the human drive force H is included in the first range RHX, the ratio A is smaller for a case where the human drive force H increase than the ratio A for a case where the human drive force H decreases.

What is claimed is:

1. A human-powered vehicle control device comprising:
   an electronic controller configured to control a motor that assists in propulsion of a human-powered vehicle including a crank,
   the electronic controller being configured to change a ratio of an assist force generated by the motor to a human drive force inputted to the crank in correspondence with the human drive force and a rotational speed of the crank,
   the electronic controller being configured to increase the ratio as the human drive force increases when the rotational speed of the crank is constant and the human drive force is included in a first range, and
   the electronic controller being configured to control the motor so that the ratio is larger when the human drive force is a first predetermined value included in a first range and the rotational speed of the crank is included in a second range than when the human drive force is the first predetermined value and the rotational speed of the crank is included in a third range that is higher than the second range.

2. The human-powered vehicle control device according to claim 1, wherein
   the first range includes at least part of a range in which the human drive force is 0 Nm or greater and 40 Nm or less.

3. The human-powered vehicle control device according to claim 1, wherein
   the second range includes at least part of a range in which the rotational speed of the crank is 0 rps or greater and 7/6 rps or less.

4. The human-powered vehicle control device according to claim 1, wherein
   at least part of the third range includes a range in which the rotational speed of the crank exceeds 7/6 rps.

5. The human-powered vehicle control device according to claim 1, wherein
   the electronic controller is configured to control the motor so that the assist force does not exceed a predetermined first value.

6. The human-powered vehicle control device according to claim 1, wherein
   the electronic controller is configured to drive the motor so that the ratio differs when the human drive force increases from the ratio when the human drive force decreases while the rotational speed of the crank is constant and the human drive force is a second predetermined value included in the first range.

7. The human-powered vehicle control device according to claim 1, wherein
   the second range at least partially differs when the rotational speed of the crank increases from the second range when the rotational speed of the crank decreases, and
   the third range at least partially differs when the rotational speed of the crank increases from the third range when the rotational speed of the crank decreases.

8. The human-powered vehicle control device according to claim 1, wherein
   the electronic controller is configured to drive the motor in correspondence with the human drive force and the rotational speed of the crank when the rotational speed of the crank becomes greater than or equal to a predetermined second value.

9. The human-powered vehicle control device according to claim 8, wherein
   the predetermined second value is a value in a range of 1/60 rps or greater and 1/6 rps or less.

10. The human-powered vehicle control device according to claim 1, wherein
    the electronic controller is configured to control the motor so that the ratio becomes equal to a target ratio obtained by multiplying a reference ratio corresponding to the human driven force by a constant determined in correspondence with the rotational speed of the crank.

11. The human-powered vehicle control device according to claim 1, wherein
    the electronic controller is configured to control the motor so that the ratio does not exceed a predetermined upper limit value.

12. The human-powered vehicle control device according to claim 11, wherein
    the electronic controller is configured to control the motor in a plurality of control states, each of the control states having a different predetermined upper limit value.

13. The human-powered vehicle control device according to claim 12, wherein
    the control states include a first control state and a second control state in which the predetermined upper limit value of the second control state is lower than that of the first control state, and
    the electronic controller is configured to control the motor so that the ratio is larger when the rotational speed of the crank is less than or equal to a predetermined third value while controlling the motor in the second control state than when the rotational speed of the crank is greater than or equal to a fourth value that is greater than the predetermined third value while controlling the motor in the first control state.

14. A human-powered vehicle control device comprising:
    an electronic controller configured to control a motor that assists in propulsion of a human-powered vehicle, wherein
    the electronic controller being configured to change a ratio of an assist force generated by the motor to human drive force input to the human-powered vehicle in correspondence with the human drive force, and
    the electronic controller being configured to control the motor so that the ratio differs when the human drive force increases from when the human drive force decreases while the human drive force is included in a first range,
    the electronic controller being configured to increase the ratio as the human-powered, driving force increases and to decrease the ratio as the human-powered driving force decreases, the ratio of the change in the ratio to the change in the human-powered driving force being finite while the human drive force is included in the first range.

15. The human-powered vehicle control device according to claim 14, wherein
the electronic controller is configured to control the motor so that the ratio is smaller when the human-driven force increases than when the human-driven force decreases while the human drive force is included in the first range.

* * * * *